US006965561B1

(12) United States Patent
Halgren et al.

(10) Patent No.: US 6,965,561 B1
(45) Date of Patent: Nov. 15, 2005

(54) TERMINAL MULTIPLEXER STRUCTURE

(75) Inventors: Ross Halgren, Callaroy Plateau (AU); Malcolm Cox, Penshurst (AU)

(73) Assignees: Redfern Braodband Networks, Inc., Wilmington, DE (US); Redfern Broadband Networks PTY Ltd., Eveleight (AU)

( * ) Notice: Subject to any disclaimer, the term of this patent is extended or adjusted under 35 U.S.C. 154(b) by 978 days.

(21) Appl. No.: 09/710,722

(22) Filed: Nov. 10, 2000

(51) Int. Cl.[7] .............................................. H04J 3/00
(52) U.S. Cl. .................................... 370/228; 370/532
(58) Field of Search .............................. 370/216–228, 370/532–541, 463; 714/1–5

(56) References Cited

U.S. PATENT DOCUMENTS

| 4,893,301 A | * | 1/1990 | Andrews et al. ............ 370/364 |
| 4,987,591 A | | 1/1991 | Ohtsuka |
| 5,027,344 A | | 6/1991 | Bellamy et al. |
| 5,442,622 A | * | 8/1995 | Hokari ........................ 340/217 |
| 5,978,353 A | * | 11/1999 | Iwahori et al. ............. 370/217 |
| 6,061,363 A | * | 5/2000 | Evans et al. ................ 370/467 |
| 6,072,794 A | * | 6/2000 | Kang ......................... 370/352 |
| 6,147,988 A | * | 11/2000 | Bartholomew et al. ..... 370/352 |
| 6,550,016 B1 | * | 4/2003 | Parrish et al. ................. 714/4 |
| 6,657,951 B1 | * | 12/2003 | Carroll et al. .............. 370/222 |

FOREIGN PATENT DOCUMENTS

| AU | 64865/94 A | 12/1994 |
| EP | 1 039 773 A2 | 9/2000 |
| GB | 2 346 280 A | 8/2000 |
| JP | 7-245792 A | 9/1995 |
| JP | 2000-175230 A | 9/1995 |
| WO | WO 99 13658 | 3/1999 |

* cited by examiner

Primary Examiner—Min Jung

(57) ABSTRACT

A terminal multiplexer structure comprising a plurality of line interface cards and a plurality of trunk interface cards wherein each of the line interface cards is connected to at least two of the trunk interface cards and comprises a switch for switching the connection transmission from the line interface board between the two trunk interface cards.

22 Claims, 2 Drawing Sheets

TERMINAL MULTIPLEXER STRUCTURE

FIELD OF THE INVENTION

The present invention relates to a terminal multiplexer structure for use in a network node system.

BACKGROUND OF THE INVENTION

There is a need for providing a flexible dense wavelength division multiplexing (DWDM) and switching architecture, eg for use in network node systems.

Traditional architectures centre around a fixed link between line interfaces and trunk interfaces to channels of the DWDM. Such architectures have the disadvantage that failure of one of the DWDM channels will effectively cut out one of the line connections, ie service to a particular subscriber is disrupted until the faulty DWDM channel has been "repaired", eg by replacing a DWDM laser.

The present invention seeks to provide a multiplexer structure which addresses this problem.

SUMMARY OF THE INVENTION

In accordance with a first aspect of the present invention there is provided a terminal multiplexer structure comprising a plurality of line interface cards and a plurality of trunk interface cards, wherein each of the line interface cards is connected to at least two of the trunk interface cards and comprises switching means for switching between the two trunk interface cards.

Accordingly, channel protection can be effected without the requirement for a separate switch rack disposed between the line interface cards and the trunk interface cards.

Preferably, the line interface cards and the trunk interface cards are configured as printed circuit boards capable of being inserted into slots of a rack of the multiplexer structure, and the connections between the line interface cards and the trunk interface cards are effected by way of backplane interconnects disposed on the backplane of the rack.

In one embodiment, the switching means comprises an electronic switch.

Advantageously, the line interface and the trunk interface cards are disposed in a manner such that each line interface card is connected to two adjacent trunk interface cards on either side of the line interface card, wherein each trunk interface card has a further trunk interface card on its other side.

In accordance with a second aspect of the present invention there is provided a terminal multiplexer structure comprising a plurality of line interface cards and a plurality of trunk interface cards, wherein each of the trunk interface cards is connected to at least two of the line interface cards and comprises switching means for switching between the two line interface cards.

Accordingly, line protection can be effected without the requirement for a separate switch rack disposed between the line interface cards and the trunk interface cards.

Preferably, the line interface cards and the trunk interface cards are configured as printed circuit boards capable of being inserted into slots of a rack of the multiplexer structure, and the connections between the line interface cards and the trunk interface cards are effected by way of backplane interconnects disposed on the backplane of the rack.

Advantageously, the line interface cards and the trunk interface cards are disposed in a manner such that each trunk interface card is connected to two adjacent line interface cards on either side of the trunk interface, wherein each line interface card has a further line interface card on its other side.

In one embodiment, the switching means comprises an electronic switch.

In accordance with a third aspect of the present invention there is provided a terminal multiplexer structure comprising a plurality of line interface cards and a plurality of trunk interface cards, wherein at least one of the line interface cards is connected to at least two of the trunk interface cards and comprises switching means for switching between the two trunk interface cards, and wherein at least one of the trunk interface cards is connected to at least two of the line interface cards and comprises switching means for switching between the two line interface cards.

Preferably, the line interface cards and the trunk interface cards are configured as printed circuit boards capable of being inserted into slots of a rack of the multiplexer structure, and the connections between the line interface cards and the trunk interface cards are effected by way of backplane interconnects disposed on the backplane of the rack.

In one embodiment, the switching means comprises an electronic switch.

In accordance with a fourth aspect of the present invention, there is provided a line interface card adapted, in use, to be connected to at least two trunk interface cards, the line interface card including switching means for switching the connection between the two trunk interface cards.

In accordance with a fifth aspect of the present invention, there is provided a trunk interface card adapted, in use, to be connected to at least two line interface cards, the trunk interface card including switching means for switching the connection between the two line interface cards.

Preferred forms of the present invention will now be described, by way of example only, with reference to the accompanying drawings.

DETAILED DESCRIPTION OF THE EMBODIMENTS

Figure 1:
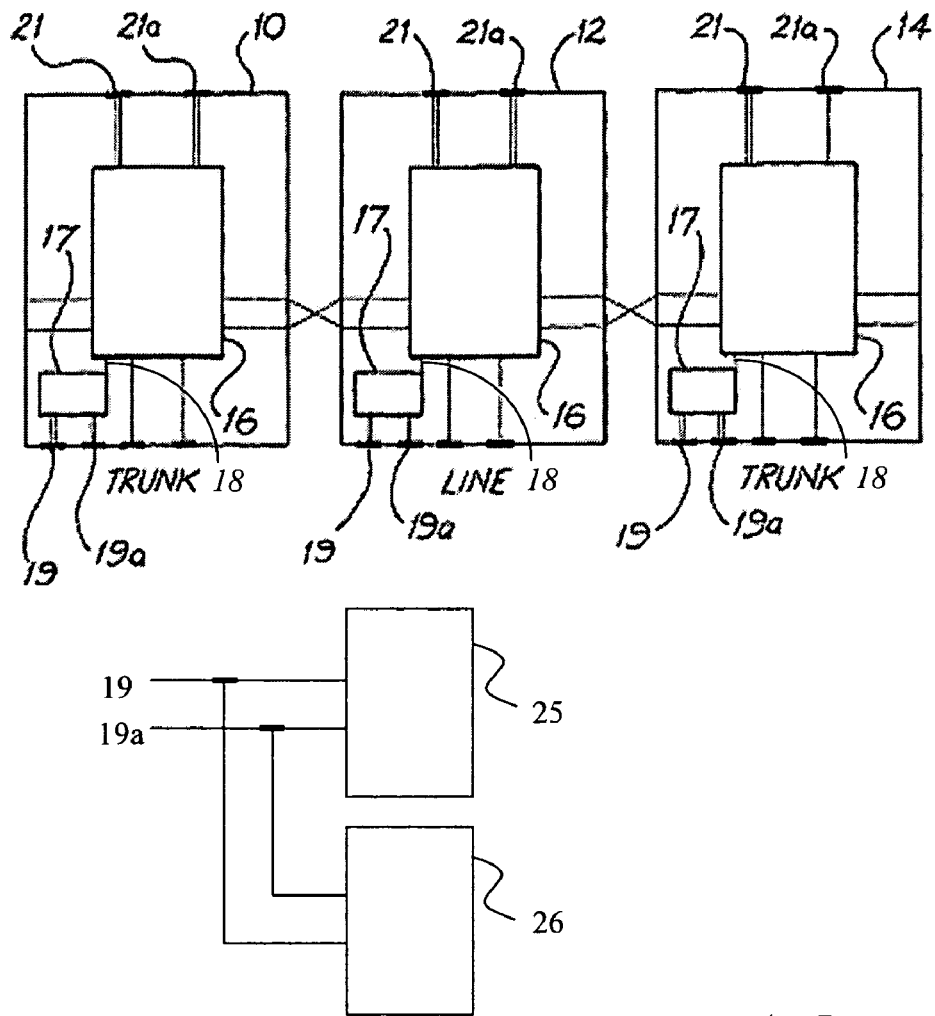
FIG. 1 is a schematic diagram showing interface cards embodying the present invention.

In FIG. 1, a line interface card 12 is located between two trunk interface cards 10, 14.

Each of the cards 10, 12, 14 comprises an on-card electronic cross connect switch 16. The cross connect switches 16 are configured in a manner such that the respective interface cards can be selectively connected to either one of its neighbouring interface cards.

More particularly, in FIG. 1 the centre line interface card 12 can be selectively connected either to the trunk interface card 10 or to the trunk interface card 14, by way of the cross connect switch 16 located on the line interface card 12.

Each cross connect switch 16 is controlled by an on-board controller 17 of the line or trunk interface cards 10, 12, 14, via an internal control channel 18. The controller 17 is itself controlled via signals received on serial connection ports 19, 19a, from two redundant communication controller (cards) 25 and 26 for default tolerance.

In use, the on-card cross connect switch 16 thus enables a 1:1 protection against failure of one of the channels to which the respective trunk interface cards 10, 14 are connected. In other words, should eg the DWDM laser of the DWDM channel to which the trunk interface card 14 is connected fail, the cross connect switch 16 on the line interface card 12 will re-direct its front interface transceiver connectivity to the trunk interface card 10.

As shown in FIG. 1, the cross connect switches 16 can alternatively be used to connect the respective cards 10, 12, 14 to two redundant external switch cards of a switch rack (not shown) via switch ports 21, 21a, should such a switch rack be provided.

It is noted that the interconnection between the cards 10, 12, 14 can be effected through backplane connections disposed on the backplane of a rack into which the cards 10, 12, 14 are, in use, inserted.

Figure 2:
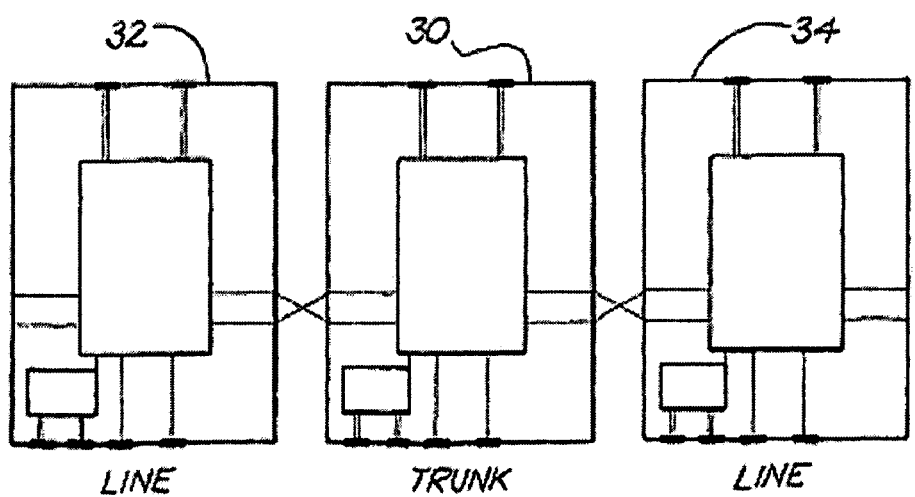
FIG. 2 is a schematic diagram illustrating a multiplexer structure embodying the present invention.

It will be appreciated by a person skilled in the art that similarly a trunk card 30 can be protected against failure of an associated line interface card by providing connectivity to two line interface cards 32, 34, wherein the trunk card 30 comprises a cross connect switch 36 to selectively connect the trunk card 30 to either of the line interface cards 32, 34 (see FIG. 2).

Figure 3:
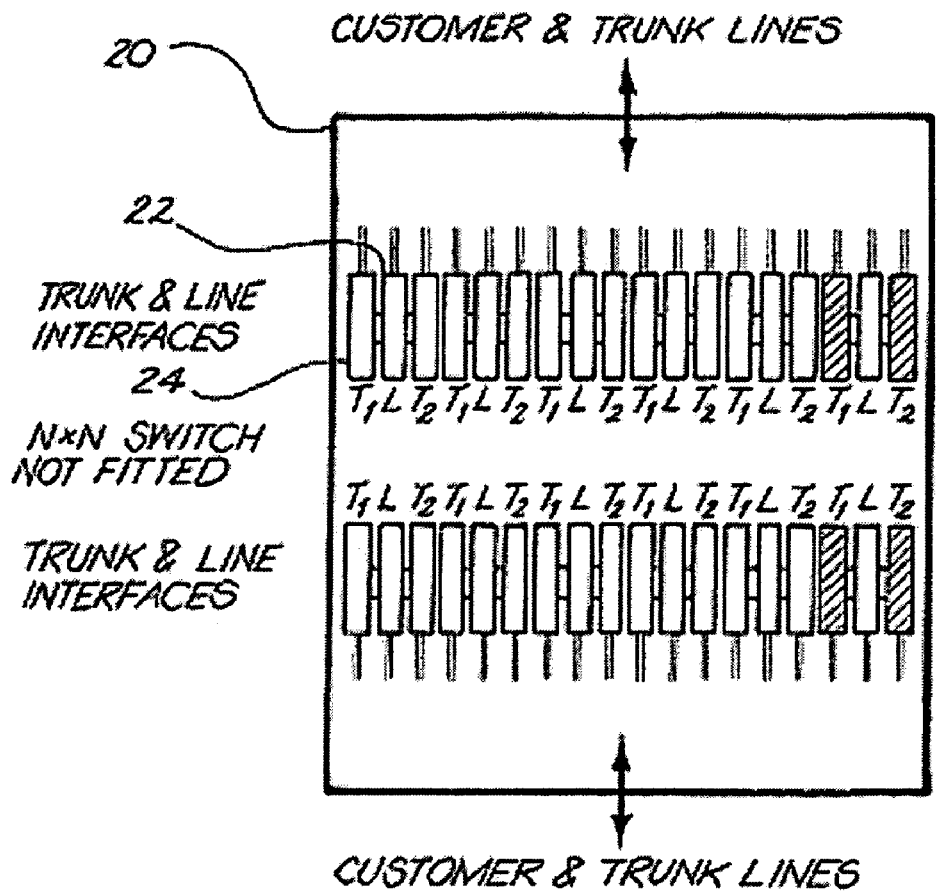
FIG. 3 is a schematic diagram illustrating a multiplexer structure embodying the present invention.

Turning now to FIG. 3, a multiplexer structure 20 comprises two sets of alternately arranged front interface cards eg 22 and line interface cards eg 24. The multiplexer structure 20 can provide 1:1 protection switching without the need for a separate switch sub-rack.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A terminal multiplexer structure comprising:
    a plurality of line interface cards;
    a plurality of trunk interface cards; and
    wherein each of the line interface cards is directly connected to at least two of the trunk interface cards and includes a switch for switching the connection between the trunk interface cards.

2. A multiplexer structure as claim 1, wherein the line interface cards and the trunk interface cards are configured as printed circuit boards configured for insertion into slots of a rack of the multiplexer structure, and the connections between the line interface cards and the trunk interface cards are effected by way of backplane interconnects disposed on the backplane of the rack.

3. A multiplexer structure of claim 1, wherein the line interface cards and the trunk interface cards are disposed in a manner such that each line interface card is connected to two adjacent trunk interface cards on either side of the line interface card.

4. A multiplexer structure of claim 3, wherein each trunk interface card has a further trunk interface card on its other side.

5. The multiplexer structure of claim 1, wherein the switch is an electronic switch.

6. The terminal multiplexer structure of claim 1, further comprising one or more communication controller cards for controlling the function of the switches.

7. A multiplexer structure comprising:
    a plurality of line interface cards;
    a plurality of trunk interface cards; and
    wherein each of the trunk interface cards is directly connected to at least two of the line interface cards and includes a switch for switching the connection between the line interface cards.

8. The terminal multiplexer structure of claim 7, further comprising one or more communications controller cards for controlling the functions of the switches.

9. A multiplexer structure of claim 7, wherein each line interface cards and the trunk interface cards are printed circuit boards configured for insertion into slots of a rack of the multiplexer structure, and the connections between the line interface cards and the trunk interface cards are effected by way of backplane interconnects disposed on a backplane of the rack.

10. A multiplexer structure of claim 7, wherein the line interface card and the trunk interface cards are disposed in a manner such that each trunk interface card is connected to two adjacent line interface cards on either side of the trunk interface card.

11. The multiplexer structure of claim 7, wherein the switch comprises an electronic switch.

12. A terminal multiplexer structure comprising:
    a plurality of line interface cards;
    a plurality of trunk interface cards;
    wherein at least one of the line interface cards is directly connected to at least two of the trunk interface cards and comprises a switch for switching between the trunk interface cards; and
    wherein at least one of the trunk interface cards is connected to at least two of the line interface cards and comprises a switch for switching between the line interface cards.

13. The terminal multiplexer structure of claim 12, further comprising one or more communications controller cards for controlling the functions of the switches.

14. A line interface card comprising:
    a first connection for connecting to a first trunk interface card;
    a second connection for connecting to a second trunk interface card;
    a switch for switching the connection between the first and second trunk interface cards; and
    a controller for controlling the function of the switch;
    wherein the controller is itself controlled by two redundant communications controllers.

15. The line interface card of claim 14, further comprising at least two switch ports for receiving control signals for the switch.

16. The line interface card of claim 14, wherein the switch is an electronic switch.

17. A trunk interface card comprising:
    a first connection for connecting to a first line interface card;
    a second connection for connecting to a second line interface card;
    a switch for switching the connection between the first and second line interface cards; and
    a controller for controlling the function of the switch;
    wherein the controller is itself controlled by two redundant communications controllers.

18. The trunk interface card of claim 17, further comprising at least two switch ports for receiving control signals for the switch.

19. The trunk interface card of claim 17, wherein the switch is an electronic switch.

20. A terminal multiplexer structure comprising:
a plurality of line interface cards;
a plurality of trunk interface cards; and
wherein at least one of the line interface cards is connected to at least two of the trunk interface cards and includes a switch for switching the connection between the trunk interface cards; and
wherein the line interface cards and the trunk interface cards are disposed in a manner such that each line interface card is connected to two adjacent trunk interface card on either side of the line interface card.

21. A multiplexer structure of claim 20, wherein each trunk interface card has a further trunk interface card on its other side.

22. A multiplexer structure comprising:
a plurality of line interface cards;
a plurality of trunk interface cards; and
wherein each of the trunk interface cards is connected to at least two of the line interface cards and including a switch for switching the connection between the line interface cards; and
wherein the line interface cards and the trunk interface cards are disposed in a manner such that each trunk interface card is connected to two adjacent line interface cards on either side of the trunk interface cards.

\* \* \* \* \*

UNITED STATES PATENT AND TRADEMARK OFFICE
CERTIFICATE OF CORRECTION

PATENT NO. : 6,965,561 B1 Page 1 of 1
DATED : November 15, 2005
INVENTOR(S) : Halgren et al.

It is certified that error appears in the above-identified patent and that said Letters Patent is hereby corrected as shown below:

<u>Title page,</u>
Item [73], Assignees, delete "Braodband" and insert -- Broadband --.

Signed and Sealed this

Ninth Day of May, 2006

JON W. DUDAS
*Director of the United States Patent and Trademark Office*